(12) United States Patent
Ulveland

(10) Patent No.: US 11,025,834 B2
(45) Date of Patent: Jun. 1, 2021

(54) METHOD AND DEVICE FOR IMPROVING CAMERA IMAGES FOR DRIVER ASSISTANCE SYSTEMS

(71) Applicant: Conti Temic microelectronic GmbH, Nuremberg (DE)

(72) Inventor: Lars Ulveland, Langenargen (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 16/479,677

(22) PCT Filed: May 2, 2018

(86) PCT No.: PCT/DE2018/200044
§ 371 (c)(1),
(2) Date: Jul. 22, 2019

(87) PCT Pub. No.: WO2018/202261
PCT Pub. Date: Nov. 8, 2018

(65) Prior Publication Data
US 2020/0195856 A1  Jun. 18, 2020

(30) Foreign Application Priority Data

May 3, 2017 (DE) ...................... 10 2017 207 376.4

(51) Int. Cl.
*H04N 5/243* (2006.01)
*H04N 5/235* (2006.01)
(52) U.S. Cl.
CPC ........... *H04N 5/243* (2013.01); *H04N 5/2351* (2013.01)

(58) Field of Classification Search
CPC ..... H04N 5/243; H04N 5/2351; H04N 5/3572
See application file for complete search history.

(56) References Cited

U.S. PATENT DOCUMENTS 9,953,210 B1 * 4/2018 Rozploch ............... G07C 9/253
2008/0252882 A1 * 10/2008 Kesterson .............. G02B 5/208
356/300

(Continued)

FOREIGN PATENT DOCUMENTS

DE 102011016652 10/2012
DE 102014217749 3/2016

OTHER PUBLICATIONS

English translation of the International Search Report of the International Searching Authority for International Application PCT/DE2018/200044, dated Jul. 25, 2018, 3 pages, European Patent Office, HV Rijswijk, Netherlands.

(Continued)

*Primary Examiner* — Gevell V Selby
(74) *Attorney, Agent, or Firm* — W. F. Fasse

(57) ABSTRACT

A method removes brightening, which is caused by scattered light, from an image of an external environment of a vehicle captured by a vehicle camera arranged in or on the vehicle. A curve of a total intensity e.g. along a respective line within the image is determined, wherein the total intensity is caused by desired light and scattered light that reach the coverage area of the vehicle camera. An approximation function of a lower limit of the scattered light intensity is estimated. The estimated approximation function is subtracted from the determined curve of the total intensity to produce a modified image with reduced or corrected scattered light.

14 Claims, 2 Drawing Sheets

(56) References Cited

U.S. PATENT DOCUMENTS

| | | | |
|---|---|---|---|
| 2012/0229681 A1* | 9/2012 | Ansfield | H04N 5/2621 348/241 |
| 2012/0268602 A1* | 10/2012 | Hirai | G06T 7/12 348/148 |
| 2016/0252905 A1 | 9/2016 | Tian et al. | |

OTHER PUBLICATIONS

PCT International Preliminary Report on Patentability including English Translation of PCT Written Opinion of the International Searching Authority for International Application PCT/DE2018/200044, dated Nov. 5, 2019, 9 pages, International Bureau of WIPO, Geneva, Switzerland.

German Search Report for German Patent Application No. 10 2017 207 376.4, dated Mar. 28, 2018, 10 pages, German Patent and Trademark Office, Muenchen, Germany, with partial English translation, 8 pages.

Myungjin Cho et al., "Three-Dimensional Imaging of Objects in Scattering Medium by Using Statistical Image Processing", Three-Dimensional Imaging, Visualization, and Display 2011, SPIE, vol. 8043, No. 1, May 13, 2011, XP060014183, pp. 1 to 8.

Uwe Artmann, "Streulicht bei Objektiven: Weniger Licht, Weniger Kontrast" ("Scattered Light in Lenses: Less Light, Less Contrast"), Mar. 7, 2012, URL: http://www.pc-magazin.de/ratgeber/streulicht-weniger-licht-weniger-kontrast-1255505.html, retrieved on Mar. 6, 2018, 4 pages.

Annika Hirsch et al., "Shading-Korrektur fuer Endoskopische Bilder und Fundusbilder" ("Shading Correction for Endoscopic Images and Fundus Images"), 10th Workshop Farbbildverarbeitung (Color Image Processing), 2004, Koblenz, Germany, http://www.uni-koblenz.de/icv/fws2004, pp. 74 to 82.

Alfred Iwainsky et al., "Lexikon der Computergrafik und Bildverarbeitung" ("Dictionary of Computer Graphics and Image Processing"), Publisher: Vieweg Verlagsgesellschaft, 1994, pp. 24, 25, 27, 28, 31-33, 156, 157, 261.

F. J. W-M Leong et al., "Correction of Uneven Illumination (Vignetting) in Digital Microscopy Images", Journal of Clinical Pathology 2003, vol. 56, No. 8, pp. 619 to 621.

Christian Muenzenmayer et al., "Enhancing Texture Analysis by Color Shading Correction", 9th Workshop Farbbildverarbeitung (Color Image Processing), 2003, 8 pages.

Carsten Steger, Slides for the Lecture "Bildverstehen I—Methoden der Industriellen Bildverarbeitung" ("Image Comprehension I—Methods of Industrial Image Processing"), Lehrstuhl Informatik IX, Technische Universitaet Muenchen, 2016, URL: https://iuks.in.tum.de/_media/members/steger/teaching/bildverstehen-i/bildverstehen-i-01-4up.paf and https://iuks.In.tum.de/_media/members/steger/teaching/bildverstehen-i/bildverstehen-i-02-4up.pdf, retrieved on Mar. 6, 2018, 16 pages.

* cited by examiner

METHOD AND DEVICE FOR IMPROVING CAMERA IMAGES FOR DRIVER ASSISTANCE SYSTEMS

FIELD OF THE INVENTION

The invention relates to a method and a device for removing brightening caused by scattered light from an image of a vehicle camera.

BACKGROUND INFORMATION

Camera systems for vehicles are known. In particular, camera systems are known in which a front camera is used for recognising a wide variety of objects in an external environment of the vehicle. Typical applications for such camera systems are, for example, recognising traffic signs, lane detection and light recognition.

The vehicle camera of a camera system is generally arranged behind a windscreen of the vehicle and looks through this in the direction of travel. In addition to the external environment of the vehicle, objects which are located inside the vehicle are usually also reproduced in images captured by the camera as a result of a reflection at both refraction boundaries (at the media air-glass-air) of the windscreen. These parasitic images of the object are superimposed on the actual effective signal and interfere with the detection of the external environment of the vehicle. To solve this problem, lens funnels or lens hoods are typically used, which are intended to suppress this interference. However, such lens hoods are inclined to scatter possible oncoming light directly into the vehicle camera. In this case, mechanical countermeasures are only effective to a limited extent and can involve higher production costs. In addition, these mechanical countermeasures also have aesthetic implications, which can have a negative effect on the design of the vehicle interior.

The aperture angle of vehicle cameras produced today is typically approximately 50°. Other road users, in particular road users, such as vehicles, bicycles or pedestrians crossing the path of the vehicle, also need to be recognised in good time. To this end, it is necessary for an aperture angle of a camera used in the camera system to be at least 100°. In this case, the aperture angle of the lens hoods is conventionally greater than the aperture angle of the camera so that the field of view of the camera is not restricted.

As a result of the above-mentioned necessary increase in the aperture angle so that road users crossing the path of the vehicle are also recognised in good time by means of the camera system, the necessary size of lens funnels also increases. In this case, both the aperture angle of the camera and the distance between a camera lens and the windscreen and the inclination of the windscreen define a necessary width of the lens hoods. In this case, the necessary increasing geometrical size of the lens hoods can impair the circumferential visibility of the vehicle driver and therefore result in the visibility of objects and other road users being impaired. One approach lies in partially dispensing with the lens hood. Scattered light entering the camera leads to undesired background signals in camera images. Entering sunlight accentuates the effective signal as a whole and blurs structures to be recognised. In this case, owing to the non-linear characteristic curve of the high dynamic range (HDR) imager, the contrast of the structures to be recognised decreases disproportionally.

Methods are furthermore known which estimate contrast relationships from a previous image and, on the basis of this, provide local contrast intensification in a subsequent image in order to thereby remove scattered light from the subsequent image.

SUMMARY OF THE INVENTION

It is the object of the present invention to provide a method and a device of the type mentioned at the outset, which enable, in particular, virtually homogeneous brightening within an image, even with an only partially formed lens hood, with minimal secondary effects.

The above object can be achieved by the subject matters of the invention as set forth herein.

The present invention proposes a computational solution for removing brightening caused by scattered light from an image of a vehicle camera, wherein this computational solution can be realised with known hardware, for example with an ISP (image signal processor), integrated local contrast intensification or tone mapping (dynamic compression for reducing the contrast range in an HDR image). The solution according to the invention enables a plurality of parameters to be monitored and plausibility-checked to stabilise and support an associated system.

The invention makes use of the fact that there are a plurality of types of artefact which are caused by oncoming light in a camera. The present invention in particular counteracts brightening which is caused by existing lens hoods. On the other hand, other scattered light artefacts, such as so-called lens flares, for instance, are not addressed.

In particular, it is taken into account that, in camera shots in which the sun is in the image or in the vicinity of the image, a considerable quantity of light is scattered into the camera via the lens hood. In this case, the form of the scattered light is dominated by a component, namely by an additive Gaussian-like distribution which is darkened at the edges, whereof the maximum in the image curve is constant and is in direct relation to the position of the sun. This relationship can then be observed when the sun is on the far right or far left of the image; although a considerable darkening at the edge hinders the estimation of the maximum, it does not render it impossible.

It should be taken into account that scattered light estimation can always be influenced by the content of the respective image. However, the present invention enables parameters to be estimated which are time-invariant or can be predicted, whereby it is possible, in particular, to plausibility-check an estimation over time.

According to a first aspect of the invention, a method for removing brightening caused by scattered light from an image of a vehicle camera is provided.

According to the method, an image of an external environment of a vehicle is captured by means of a vehicle camera which is arranged in or on the vehicle. In this case, the viewing direction of the vehicle camera can be selected as required. Therefore, the vehicle camera can be arranged, for example, in the region of a windscreen of the vehicle and can look through this in the direction of travel. However, this is purely an example. The vehicle camera can equally be arranged in the region of a rear window of the vehicle, for example, and can look through this in the backwards direction. The vehicle is, for example, a motor vehicle, such as a car, bus or heavy goods vehicle. A curve of the total intensity (including the undesired scattered light intensity) within the image is determined, for example in the horizontal direction. The total intensity is therefore caused by desired light and scattered light. In this case, the scattered light intensity is caused by scattered light which reaches the coverage area of the vehicle camera. In particular, the scattered light is caused by light from the sun which is in the image or in the vicinity of the image, wherein a considerably quantity of sunlight is scattered into the camera via the lens hood.

Determining (estimating) the curve of the scattered light intensity can take place, for example, by means of a mini filter, erosion or similar methods, namely in particular over the whole image, line by line or block by block.

An approximation function of a curve of the lower limit of the scattered light intensity is estimated. In other words, an approximation function is established, which describes the lower limit of the curve of the scattered light intensity. In this context, the feature "lower limit of the scattered light intensity" can be understood to mean, in particular, an intensity curve of the scattered light intensity in the horizontal direction, which does not exceed the determined total intensity. In particular, the lower limit of the scattered light intensity can proceed below and substantially parallel to the determined total intensity. In this case, the closer the estimated approximation function comes to the actual determined curve of the scattered light intensity, the more scattered light can subsequently be correctly removed from the captured image, as described below.

The estimated approximation function is furthermore subtracted or deducted from the determined curve of the (total) intensity, wherein the subtraction or deduction takes place in particular line by line. In this case, the determined light intensity can be reduced locally, in particular at a horizontal point in a line of a relevant image, in each case by an amount which assumes the estimated approximation function at the relevant point. As a result of the subtraction or deduction (and in particular repeating the procedures described above for a plurality of lines, preferably all lines, of the captured image), an altered image, from which scattered light has been removed (image with corrected scattered light) is produced from the captured image of the image sequence. This image is provided—it can be, for example, output, further processed and/or displayed—on a display inside the vehicle, for example. From the image with reduced scattered light or corrected scattered light, objects in the vehicle environment, for example, can be detected and classified by means of image processing.

According to one embodiment, a Gaussian distribution is selected as the approximation function of the lower limit of the scattered light intensity. A Gaussian distribution particularly precisely describes the scattered light intensity within the image which is caused by sunlight.

It can furthermore be advantageous that the determination of the curve of the scattered light intensity takes place over the whole image, line by line or block by block. In this case, the estimation of the approximation function and the subtraction of the estimated approximation function from the determined curve of the intensity can likewise take place accordingly over the whole image, line by line or block by block.

According to a further embodiment, it is provided that, to estimate the approximation function of the lower limit of the scattered light intensity, interpolation is carried out area by area. This is advantageous in particular in situations in which the estimation in blocks or lines is absent or fails. In particular, a representation of the sky or an area surrounding the sun can interfere particularly greatly with the estimation.

The estimation of the curve of the approximation function of the lower limit of the scattered light intensity can be supported and plausibility-checked using a plurality of conditions to reduce the risk of subtracting or deducting too much or committing errors influenced by the image content.

In this regard, according to a further embodiment of the invention, there is provision for checking whether the position of the maximum of the determined total intensity is constant along a vertical curve of the image. If this check delivers a positive result, i.e. that the position of the maximum remains constant along the vertical curve of the image, it can be assumed that too much has not been subtracted. It is thus possible to eliminate overly strong fluctuations in the strength or the light intensity along the image height.

Alternatively or additionally, there can furthermore be provision for checking whether the scattered light within the captured image has the same colour. According to this embodiment, use is made of the fact that scattered light has the same colour everywhere, namely the colour of the sunlight. In particular, the sun is yellowish white to orange.

The estimated parameters (i.e. the estimation of the approximation function of the curve of the lower limit of the scattered light intensity) can also be tracked from image to image. In this sense, according to a further embodiment, it is provided that the estimated approximation function of the curve of the lower limit of the scattered light intensity within a first image is tracked in at least one subsequently captured second image of the external environment of the vehicle. This makes use of the fact that a position of the sun, taking into account the egomotion of the vehicle or the vehicle camera, alters very slowly over time.

In this context, taking into account the egomotion of the vehicle camera, in particular by means of a filter, for example by means of a Kalman filter, a position of the sun which causes the scattered light in the at least one subsequently captured second image of the external environment of the vehicle is estimated. This is particularly advantageous when the sun disappears and then subsequently appears again, which can be the case, for example, when shade from trees, buildings or an underpass are present. A problem which occurs in known methods is thus additionally solved: There is no need to estimate all parameters again from image to image, only the strength, if only a contribution from the previous first image needs to be estimated.

According to a further embodiment of the method, a vignetting of the scattered light is taken into account. This enables the estimation of the lower limit of the scattered light intensity to be implemented more robustly.

According to a second aspect of the invention, a device for removing brightening caused by scattered light from an image of a vehicle camera is provided. The device comprises a vehicle camera and a processor unit, wherein the vehicle camera can be arranged on a vehicle in such a way that the vehicle camera can capture at least one image of an external environment of the vehicle, and wherein the processor unit is equipped to carry out the method steps in accordance with the method according to the first aspect of the invention.

BRIEF DESCRIPTION OF THE DRAWINGS

Exemplary embodiments of the invention are explained in more detail below with reference to the schematic drawing, which shows.

DETAILED DESCRIPTION OF EXAMPLE EMBODIMENTS OF THE INVENTION

Figure 1:
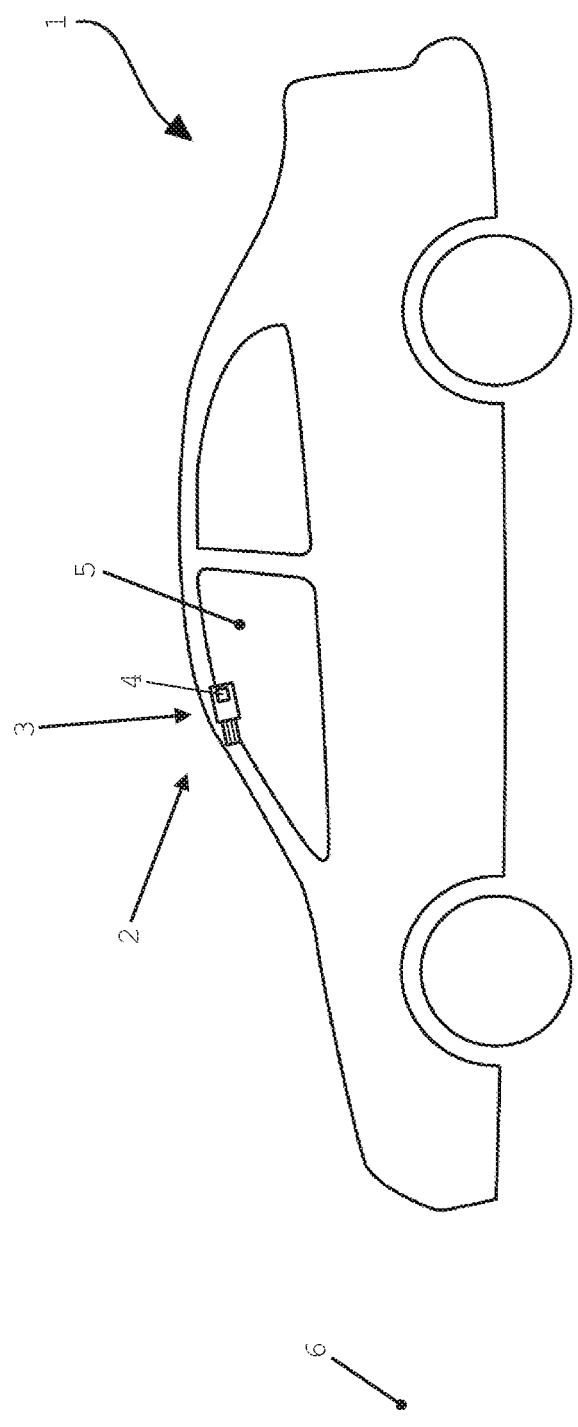
FIG. 1 a side view of a vehicle with an exemplary embodiment of a device according to the invention.

FIG. 1 shows a vehicle 1—a car in the exemplary embodiment shown. The vehicle 1 comprises a device 2 for removing brightening caused by scattered light from an image of a vehicle camera 3. In the exemplary embodiment shown, the device has a vehicle camera 3 and a processor unit 4.

The vehicle camera 3 can be arranged in an interior 5 of the vehicle 1, namely in particular in a region behind a windscreen of the vehicle 1. An image or an image sequence of an external environment 6 of the vehicle 1 can be captured through the windscreen by means of the vehicle camera 3, wherein the image sequence can comprise a plurality of external photographs and wherein the external photographs are taken in time succession.

Figure 2:
FIG. 2 a graphical comparison of a determined curve of a total intensity, an approximation function of a curve of a lower limit of the scattered light intensity and a difference of the above-mentioned curves.

FIG. 2 shows a chart, wherein a horizontal position is indicated on a horizontal axis, and wherein a linear intensity is indicated on a vertical axis. In the chart, the following three graphs are plotted for a line of an image captured by means of the vehicle camera 3 which depicts the external environment 6 of the vehicle 1: a first graph 7, which corresponds to a determined curve of the recorded (total) intensity, a second graph 8, which corresponds to an estimated approximation function of a curve of a lower limit of the scattered light intensity, and a third graph 9 which, for each horizontal position of the image line, corresponds to a difference between the first graph 7 and the second graph 8. The third graph 9 therefore corresponds to the image with corrected scattered light.

The intensity is caused by light which reaches the coverage area of the vehicle camera 3. The determination of the curve of the approximation function 8 of the scattered light intensity can take place by means of the processor unit 4, for example by means of a mini filter, erosion or similar methods.

In the exemplary embodiment shown, the estimated curve of the lower limit of the scattered light intensity (second graph 8) is based on a Gaussian curve and represents a line-by-line intensity curve of the scattered light intensity in the horizontal direction, wherein the estimated scattered light intensity does not exceed the determined intensity (first graph 7). To estimate the approximation function 8 of the lower limit of the scattered light intensity, interpolation can be carried out area-by-area, in particular where the estimation is absent or fails.

The estimation of the approximation function can be supported and plausibility-checked using a plurality of conditions to reduce the risk of subtracting or deducting too much or committing errors influenced by the image content.

Therefore, to evaluate the plausibility of the estimated approximation function 8, it can be checked whether the position of the maximum of the total intensity 7 and the determined intensity 9 with the corrected scattered light is constant along a vertical curve of the image. If this check delivers a positive result, i.e. that the position of the maximum remains constant along the vertical curve of the image, it can be assumed that too much has not been subtracted.

Furthermore, as a result of a corresponding estimation of the approximation function, it is possible to eliminate overly strong fluctuations in the strength or the light intensity along the image height, at least in sections. The graph 9 in FIG. 2, for example, the intensity in the horizontal areas 0 to 250, 550 to 750 and 800 to 900 is relatively constant (intensity values between approximately 500 and 1500).

Alternatively or additionally, to evaluate the plausibility of the estimated approximation function, it can be checked whether the scattered light within the captured image has the same colour.

As a result of the subtraction or deduction for each image line of the image, an altered image, from which scattered light has been removed (image with corrected scattered light, third graph 9) is produced from the captured image of the image sequence. This image can be output, further processed and/or displayed, for example on a display inside the vehicle.

The estimation of the curve of the lower limit of the scattered light intensity 8 can also be tracked from image to image. In this sense, the estimated approximation function of the lower limit of the scattered light intensity 8 within a first image can be tracked in at least one subsequently captured second image of the external environment of the vehicle. To this end, use is made of the fact that a position of the sun, taking into account the egomotion of the vehicle or the vehicle camera, barely alters over time. In this context, taking into account the egomotion of the vehicle camera in particular by means of a filter, for example by means of a Kalman filter, a position of the sun which causes the scattered light in the second image can be estimated. This is particularly advantageous if the sun disappears and appears again, which can be the case, for example, when shade from trees, buildings or an underpass are present.

The invention claimed is:

1. A method of computationally removing brightening caused by scattered light from an image of a vehicle camera, the method comprising the method steps:
   capturing a captured image of an external environment of a vehicle by a vehicle camera arranged in or on the vehicle, and
   by a processor unit:
   determining a curve of a total intensity within the captured image, wherein the total intensity includes a desired light intensity of desired light and a scattered light intensity of scattered light which reach an image capture coverage area of the vehicle camera and are included in the captured image,
   estimating an approximation function of a lower limit of the scattered light intensity,
   subtracting the estimated approximation function of the lower limit of the scattered light intensity from the determined curve of the total intensity to produce a corrected intensity curve,
   producing a modified image with corrected scattered light based on the corrected intensity curve, and
   providing the modified image with corrected scattered light.

2. The method according to claim 1, wherein the approximation function of the lower limit of the scattered light intensity comprises a Gaussian distribution.

3. The method according to claim 1, comprising performing the determining of the curve of the total intensity respectively line by line or block by block over an entire image area of the captured image.

4. The method according to claim 1, wherein the estimating of the approximation function of the lower limit of the scattered light intensity comprises performing interpolation area by area over the captured image.

5. The method according to claim 1, wherein the estimating of the approximation function of the lower limit of the scattered light intensity comprises checking whether a maximum of the determined curve of the total intensity and a maximum of the corrected intensity curve occur at a same position along a vertical curve of the captured image.

6. The method according to claim 1, further comprising checking whether the scattered light has the same color throughout the captured image.

7. The method according to claim 1, wherein the captured image is a first captured image, further comprising capturing a second captured image of the external environment by the vehicle camera after the first captured image, and tracking the estimated approximation function of the lower limit of the scattered light intensity from the first captured image in the second captured image.

8. The method according to claim 7, further comprising estimating a position of a sun which causes the scattered light in the second captured image, while filtering to account for a motion of the vehicle camera.

9. The method according to claim 1, further comprising taking into account a vignetting of the scattered light.

10. The method according to claim 1, wherein the estimating of the approximation function of the lower limit of the scattered light intensity eliminates strong fluctuations in the corrected intensity curve along a vertical curve of the image at least in sections thereof.

11. The method according to claim 1, wherein the providing of the modified image comprises displaying the modified image on a display device.

12. The method according to claim 1, wherein the providing of the modified image comprises processing the modified image to detect objects in the vehicle environment.

13. The method according to claim 1, wherein the scattered light and the brightening that is removed by the method are caused only by sunlight that is scattered from a lens hood of the vehicle camera.

14. A device for computationally removing brightening caused by scattered light from an image of a vehicle camera, the device comprising a vehicle camera and a processor unit, wherein the vehicle camera is configured and equipped to be arranged on a vehicle so as to capture a captured image of an external environment of the vehicle, and wherein the processor unit is configured to:

determine a curve of a total intensity within the captured image, wherein the total intensity includes a desired light intensity of desired light and a scattered light intensity of scattered light which reach an image capture coverage area of the vehicle camera and are included in the captured image, estimate an approximation function of a lower limit of the scattered light intensity, subtract the estimated approximation function of the lower limit of the scattered light intensity from the determined curve of the total intensity to produce a corrected intensity curve, produce a modified image with corrected scattered light based on the corrected intensity curve, and provide the modified image with corrected scattered light.

* * * * *